United States Patent
Brown et al.

(10) Patent No.: US 7,182,864 B2
(45) Date of Patent: Feb. 27, 2007

(54) HOUSING FOR ENVIRONMENTALLY FRIENDLY FILTER CARTRIDGE

(75) Inventors: Gene W. Brown, Kearney, NE (US); Steven J. Merritt, Kearney, NE (US)

(73) Assignee: Baldwin Filters, Inc., Kearney, NE (US)

(*) Notice: Subject to any disclaimer, the term of this patent is extended or adjusted under 35 U.S.C. 154(b) by 43 days.

(21) Appl. No.: 10/457,733

(22) Filed: Jun. 9, 2003

(65) Prior Publication Data

US 2003/0226790 A1    Dec. 11, 2003

Related U.S. Application Data

(60) Provisional application No. 60/387,235, filed on Jun. 7, 2002.

(51) Int. Cl.
*B01D 35/31* (2006.01)
*B01D 35/34* (2006.01)

(52) U.S. Cl. .................. 210/232; 210/441; 210/450; 210/451

(58) Field of Classification Search .......... 210/90, 210/441, 450, 340, 232, 451, 442
See application file for complete search history.

(56) References Cited

U.S. PATENT DOCUMENTS

| | | | |
|---|---|---|---|
| 2,196,821 A | | 4/1940 | Arnold |
| 2,411,539 A | * | 11/1946 | Gunn .......................... 184/624 |
| 2,537,992 A | | 1/1951 | Gross et al. |
| 2,601,404 A | | 6/1952 | Lasky |
| 2,843,268 A | | 7/1958 | Kennedy |
| 2,942,572 A | * | 6/1960 | Pall ............................. 116/267 |
| 3,056,499 A | * | 10/1962 | Liddell ........................ 210/108 |
| 3,846,307 A | * | 11/1974 | Petrucci et al. .......... 210/323.2 |
| 4,324,660 A | | 4/1982 | Peyton et al. |
| 4,501,660 A | | 2/1985 | Hebert |
| 4,557,829 A | | 12/1985 | Fields |
| 4,655,914 A | | 4/1987 | Wada |
| 4,733,449 A | | 3/1988 | Spearman |
| 4,802,979 A | | 2/1989 | Medley, III |
| 4,832,836 A | | 5/1989 | Selsdon |
| 4,872,976 A | | 10/1989 | Cudaback |
| 5,078,877 A | | 1/1992 | Cudaback et al. |

(Continued)

FOREIGN PATENT DOCUMENTS

EP    0287527 A2    10/1988

(Continued)

*Primary Examiner*—Terry K. Cecil
(74) *Attorney, Agent, or Firm*—Leydig, Voit & Mayer, Ltd.

(57) ABSTRACT

A filter system in which a housing and an environmentally friendly filter cartridge are coordinated to provide ease of change of the filter cartridge and reliable operation. The cartridge contains no metal parts and is readily incinerateable. The housing is provided with a number of "universality" features including a changeable bottom which allows the housing to operate as a fuel filter, a lubrication filter, or a hydraulic filter in different applications. The housing and cartridge are configured to provide support for the plastic elements of the cartridge to prevent crushing of the filter under normal and abnormal filter operating conditions. A key system associated with the cartridge and the housing provides assurance that the correct filter is installed for a particular application.

14 Claims, 10 Drawing Sheets

U.S. PATENT DOCUMENTS

| | | | |
|---|---|---|---|
| 5,089,131 A * | 2/1992 | Gentry | 210/253 |
| 5,180,490 A | 1/1993 | Eihusen et al. | |
| 5,234,585 A * | 8/1993 | Zuk, Jr. | 210/188 |
| 5,236,579 A * | 8/1993 | Janik et al. | 210/94 |
| 5,342,511 A | 8/1994 | Brown et al. | |
| 5,447,627 A | 9/1995 | Loafman et al. | |
| 5,490,930 A | 2/1996 | Krull | |
| 5,525,226 A | 6/1996 | Brown et al. | |
| 5,527,463 A * | 6/1996 | Morgan, Jr. | 210/450 |
| 5,538,542 A | 7/1996 | Watanabe et al. | |
| 5,538,543 A | 7/1996 | Watanabe et al. | |
| 5,660,802 A * | 8/1997 | Archer et al. | 422/261 |
| 5,685,985 A * | 11/1997 | Brown et al. | 210/450 |
| 5,695,637 A | 12/1997 | Jiang et al. | |
| 5,702,592 A * | 12/1997 | Suri et al. | 210/90 |
| 5,702,602 A | 12/1997 | Brown et al. | |
| 5,738,785 A | 4/1998 | Brown et al. | |
| 5,888,383 A | 3/1999 | Cox | |
| 5,904,357 A | 5/1999 | Demirdogen et al. | |
| 5,906,736 A | 5/1999 | Bounnakhom et al. | |
| 5,996,810 A | 12/1999 | Bounnakhom et al. | |
| 6,024,229 A | 2/2000 | Ayers | |
| 6,045,693 A | 4/2000 | Miller et al. | |
| 6,174,438 B1 * | 1/2001 | Hodgkins et al. | 210/315 |
| 6,235,194 B1 * | 5/2001 | Jousset | 210/206 |
| 6,248,236 B1 | 6/2001 | Hodgkins | |
| 6,322,697 B1 | 11/2001 | Hacker et al. | |
| 6,478,958 B1 | 11/2002 | Beard et al. | |
| 6,555,000 B2 * | 4/2003 | Knight | 210/416.4 |

FOREIGN PATENT DOCUMENTS

| | | |
|---|---|---|
| EP | 0631804 | 1/1995 |
| GB | 1571486 | 7/1980 |
| WO | WO 86/03687 A1 | 7/1986 |
| WO | WO 01/79683 | 10/2001 |

* cited by examiner

HOUSING FOR ENVIRONMENTALLY FRIENDLY FILTER CARTRIDGE

CROSS-REFERENCE TO RELATED PATENT APPLICATIONS

This patent application claims the benefit of U.S. Provisional Patent Application No. 60/387,235, filed Jun. 7, 2002.

FIELD OF THE INVENTION

This invention pertains to filters, and more particularly to a filter system using an environmentally friendly filter cartridge.

BACKGROUND OF THE INVENTION

Most conventional filters and filter cartridges present a disposal problem. Driven by ease of installation, many applications have gone to self-contained spin-on cartridges. These have a metal outer case, a metal base plate, and other metal components within the filter. Replaceable cartridges also have significant metal components, often in the form of centertubes or support grids for supporting the filter element, and metal endcaps. Thus, significant elements of a filter will not burn thus preventing the use of incineration for relatively complete disposal of the spent filters or filter cartridges.

BRIEF SUMMARY OF THE INVENTION

In view of the foregoing, it is a general aim of the present invention to provide a filter system capable of supporting and reliably using an environmentally friendly filter cartridge, such that when the cartridge is spent it can be incinerated. The cartridge is environmentally friendly in that it contains no metallic parts.

It is a feature of the invention that plastic endcaps are utilized in the filter cartridge, and the housing has structure which cooperates with the filter cartridge to compensate for the reduction in strength of plastic endcaps over conventional metal endcaps.

In a particular embodiment the invention provides a filter system based on a housing having a closed bottom and a removable cover. A filter cartridge is provided for insertion into the housing and for securing therein by locking the removable cover on the housing. The cartridge is in the form of an open center cylinder which has no metallic parts. The housing has, at its base, an upstanding annular flange which has a diameter about the same as the outer diameter of the cartridge. The cartridge carries a radial seal in the form of a depending skirt fixed to a lower endcap. The skirt has a diameter which causes the skirt to overlie the annular flange such that when the filter is in operation, internal pressure creates a radial seal between the skirt and the flange. The cartridge also has an upper endcap which carries an axial seal positioned to fit between the housing and the cover when the cover is in its locked position. The system provides cooperating supports and stops on the inside of the housing and the lower portion of the upper endcap to provide a positive seat and stop which prevents operating pressure from forcing the upper endcap into the filter beyond its seated position.

In another aspect, the invention provides a filter housing of universal characteristics for cooperating with a filter cartridge to filter fluid. A housing is provided for receiving a filter cartridge which separates an unfiltered region from a filtered region in the housing. The housing has a front in which is formed an inlet port and an outlet port connected to the unfiltered region and filtered region respectively, and also connected to at least one accessory port. A removable cover is threaded onto the top of the housing and removable for allowing access to and interchange of the cartridge. The housing has bolted on removable base selected from the group consisting of a sump for fuel filter applications, and a rigidified bottom for high pressure applications.

In another aspect, the invention provides a filter housing in an interconnected filter housing bank, wherein each filter housing is adapted to receive a filter cartridge which separates an unfiltered region from a filtered region in the housing. The housing has a back which includes mounting features for mounting a plurality of said housings side-by-side in a bank. The housing has a front in which is formed an inlet port and an outlet port connected to the unfiltered region and filtered region respectively. The inlet port and outlet port are vertically displaced from each on the front of said housing. Tee fittings are connected on the inlet and outlet ports. Each tee fitting has a trunk connected to the associated port and a T-arm in fluid communication with the trunk. At least some of the tee fittings having a valve for shutting off the trunk from the T-arm. The valve bank including tubing connecting the T-arms of adjacent filter housings to connect the filter housings and parallel.

In connection with the foregoing aspect of the invention, the filter bank also includes at least two filter housings, each requiring a filter of different characteristics. Two filter cartridges of the different characteristics, one for each of said housings, and each of the housings and filters including a keying mechanism for associating one of the filter cartridges with the associated housing and preventing installation of said one filter cartridge in the other housing.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

The disclosed housing in the present application will be described primarily in connection with fuel filters. The housing is designed for multiple parallel plumbing of fuel filters, as will be described in connection with FIG. 4. The housing, however, can also be used to form a full flow oil filter, a hydraulic filter or a bypass filter. Some of these applications will also be illustrated to show the universality of the filter system.

Figure 1:
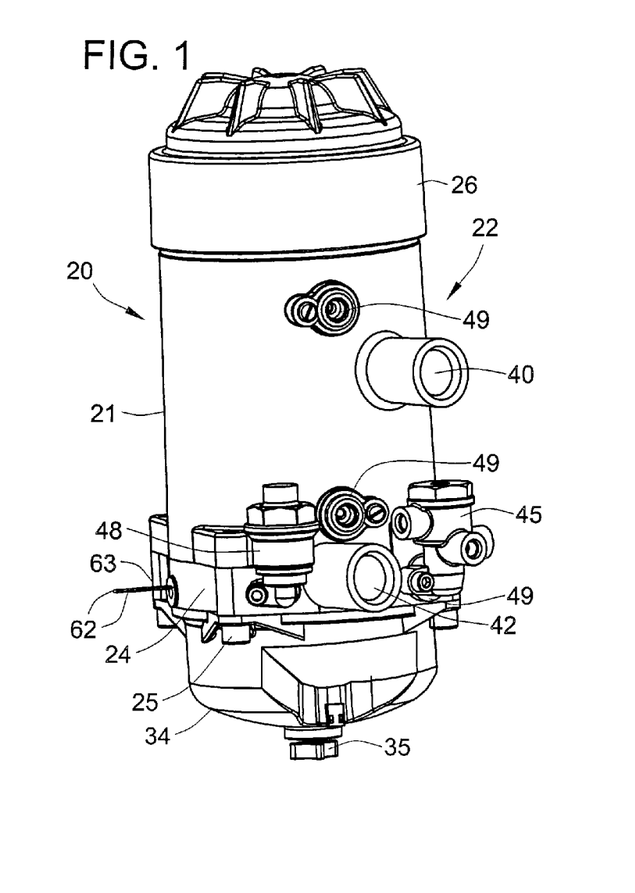
FIG. 1 is a front elevation of one form of housing constructed in accordance with the present invention.
Figure 2:
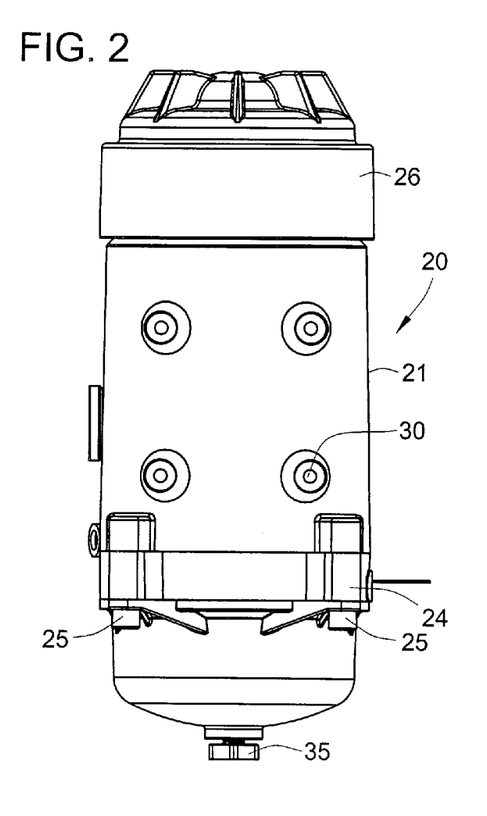
FIG. 2 is a rear elevation of the housing of FIG. 1.

Turning then to the drawings, and particularly to FIGS. 1 and 2, there are shown many of the basic elements of the housing portion of a filter system 20 constructed in accordance with the present invention. The system 20 is based on a housing 21 which has a plurality of ports 22 on the face thereof which allow configuration for a variety of applications. Of significance, the housing 21 is provided with a removable base 24; as will be described below, a number of different bases 24 can be provided to alter the application for which the filter system is used. The bottom 24 is secured to the housing 21 by a secure mounting structure, such as the threaded fasteners 25 illustrated in the drawings. Preferably cap screws 25 are used at four locations to secure the bottom in place; since the bottom will not typically be removed after the housing is dedicated to a particular installation, the attachment can be relatively permanent. The advantages of the ability to bolt a different bottom in place are achieved primarily in the manufacturing stage when a run of filters for a particular application is being made. The application shown in FIGS. 1 and 2 is primarily for use as a fuel filter.

The housing 21 has a removable cover 26. Complementary threads (not shown in FIGS. 1 and 2) on the inside of the cover 26 and on the outside of the housing 21 allow the cover to be screwed onto the top of the housing. As will also be described, an internal filter cartridge carries an axial seal gasket which is trapped between sealing faces of the cover and housing for preventing leakage between those elements.

Figure 4:
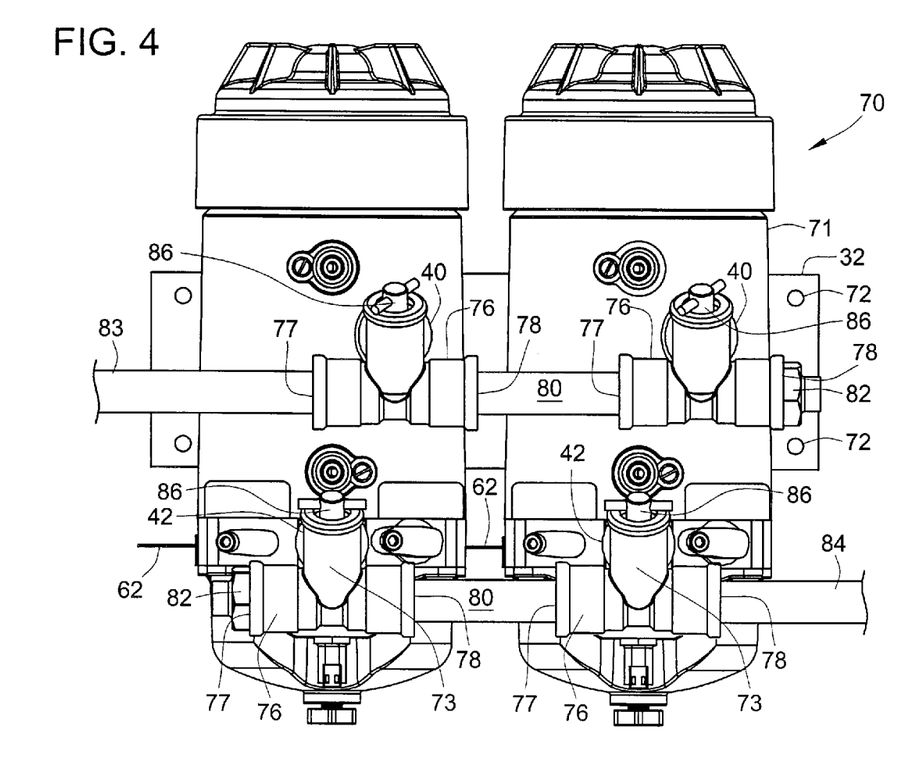
FIG. 4 is a front elevation showing two filter housings assembled in a filter bank.

FIG. 2 illustrates four mounting bosses 30 on the back of the housing 21. The mounting bosses are preferably threaded to allow one or more filters to be mounted on a plate, with the plate then mounted in the position where the filters will be utilized. FIG. 4, for example, shows a gang of two filters in which a plate 32 supports both filters. A bolt passed through the plate and into the tapped bosses 30 securely attaches the individual filters to the plate, whereupon the plurality of filters can be treated as a multiple filter bank for unitary mounting.

As noted above, the unit illustrated in FIGS. 1, 2 and 4 is intended primarily in fuel filter applications. As such, the bottom assembly 24 includes a sump 34 which is typically used to collect water and other debris in a fuel filter application. Preferably the sump 34 is of see through plastic and includes a self-venting drain valve 35 for periodically removing the collected impurities.

Figure 3:
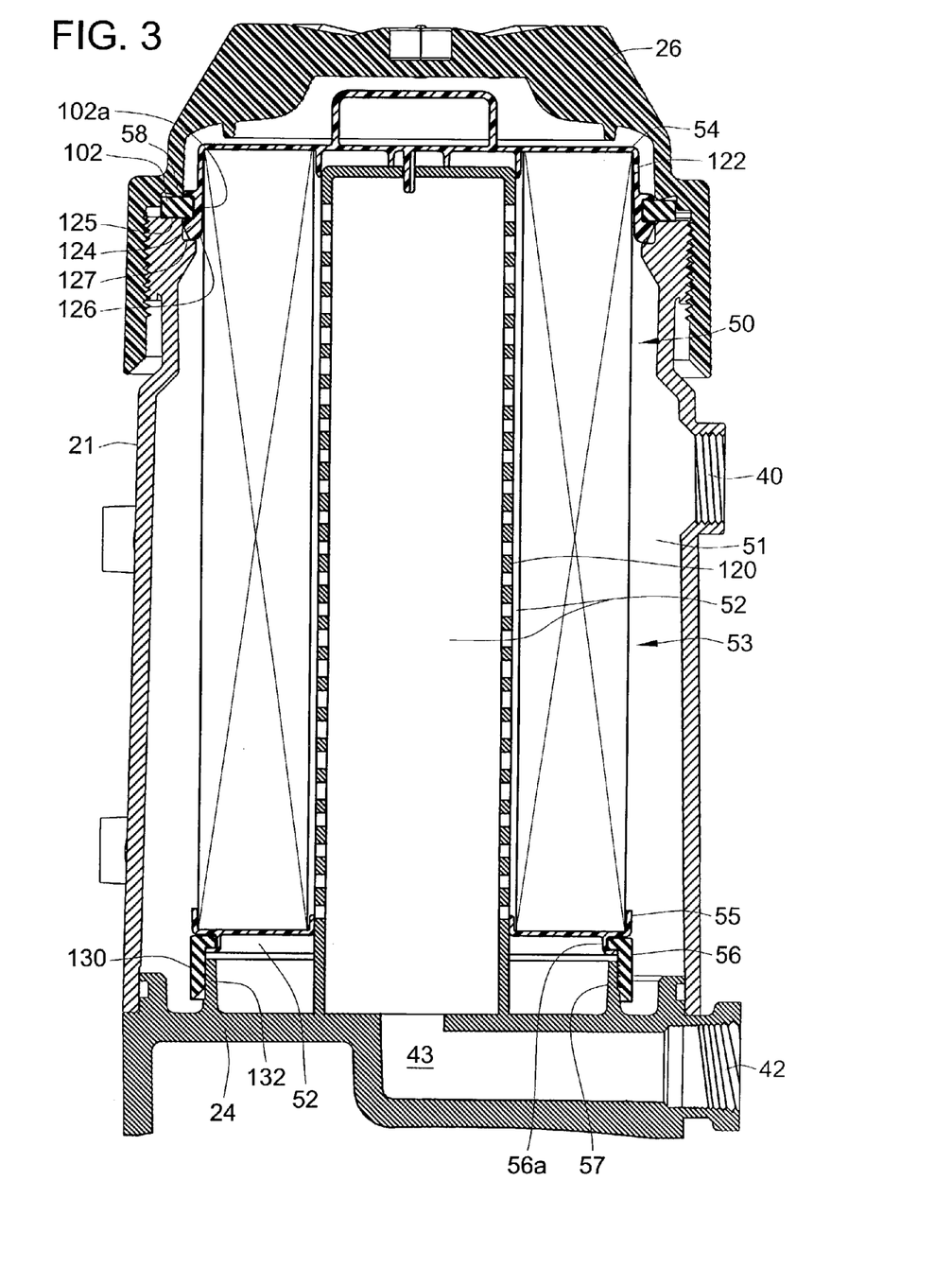
FIG. 3 is a cross-sectional view taken generally along the line 3—3 of FIG. 5 illustrating the relationship between the filter cartridge and the filter housing in a filter system similar to that of FIG. 1.

FIG. 3 is intended to illustrate the relationship between the housing 21 and the filter cartridge which it contains. For purposes of illustration, FIG. 3 shows a cross-sectional view for a filter which is slightly different from the fuel filter, namely a lubrication filter. In effect, FIG. 3 is a section of the lubrication filter shown in FIG. 5. The components are substantially the same as those in FIGS. 1 and 2, except many of the peripheral and accessory components associated with a fuel filter are removed. The description of the housing, unless otherwise noted, would be the same for both the fuel filter and hydraulic filter applications.

Figure 8:
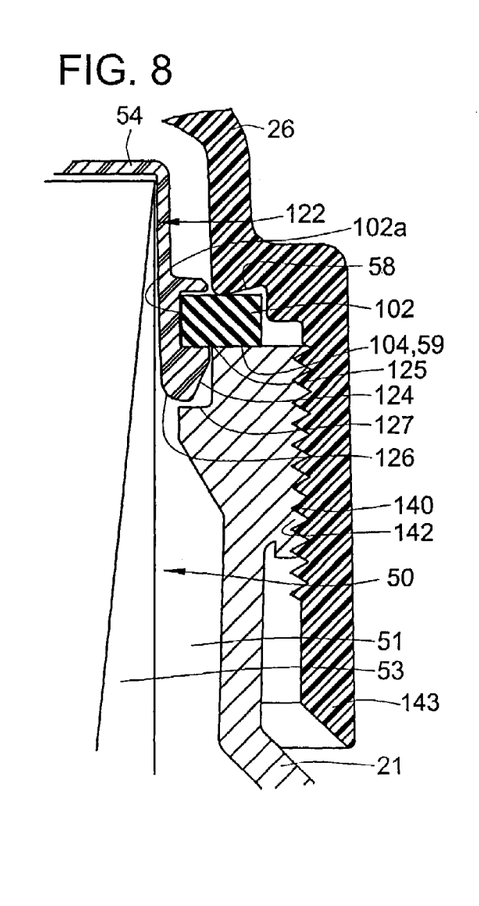
FIG. 8 is a partial view of the area of FIG. 7 indicated by the circle 8 better illustrating the locking of the cover to the housing and compressing of the axial seal gasket.

FIGS. 3 and 8 illustrate certain of the internal elements of the filter system 20. A cylindrical filter cartridge 50 fits within the housing 21. The cartridge is inserted by removing the cover 26, dropping a cartridge 50 in place, then reattaching the cover 26. In the illustrated embodiment flow through the filter is from the outside in. Thus an exterior region 51 outside the periphery of the filter is dedicated to unfiltered fluid, while a region 52 within the bore of the filter is dedicated to filtered fluid. As will be understood by those skilled in this art, flow through the filter from the unfiltered region 51 to the filtered region 52 serves to remove impurities as the fluid passes through the filter medium.

The cartridge 50 includes a filter element 53 having an upper endcap 54 and a lower endcap 55. The lower endcap 55 has a radial seal gasket 56 associated therewith which interacts with an annular flange 57 on the housing base to provide a highly effective but simple radial seal 56 at the lower end of the filter separating the unfiltered region 51 from the filtered region 52. An axial seal 102 is carried by the upper endcap 54 and is pinched between an inside shoulder 58 of the cover 26 and a mating shoulder 59 of the filter housing.

An inlet port 40 penetrates the wall of the housing 21 and is in fluid communication with the unfiltered region 51, as best shown in FIG. 3. An outlet port 42 is also provided on the exterior of the housing, in this case being formed in the baseplate 24 itself. The outlet port 42 communicates through an internal channel 43 (see FIG. 3) to the filtered fluid region 52. Thus fluid which passes through the inlet 40 passes through the filter element 53 to the clean region 52 in the bore of the cartridge, thereupon passes through the channel 43 in the outlet port 42 to the utilization device, usually an engine.

Figure 7:
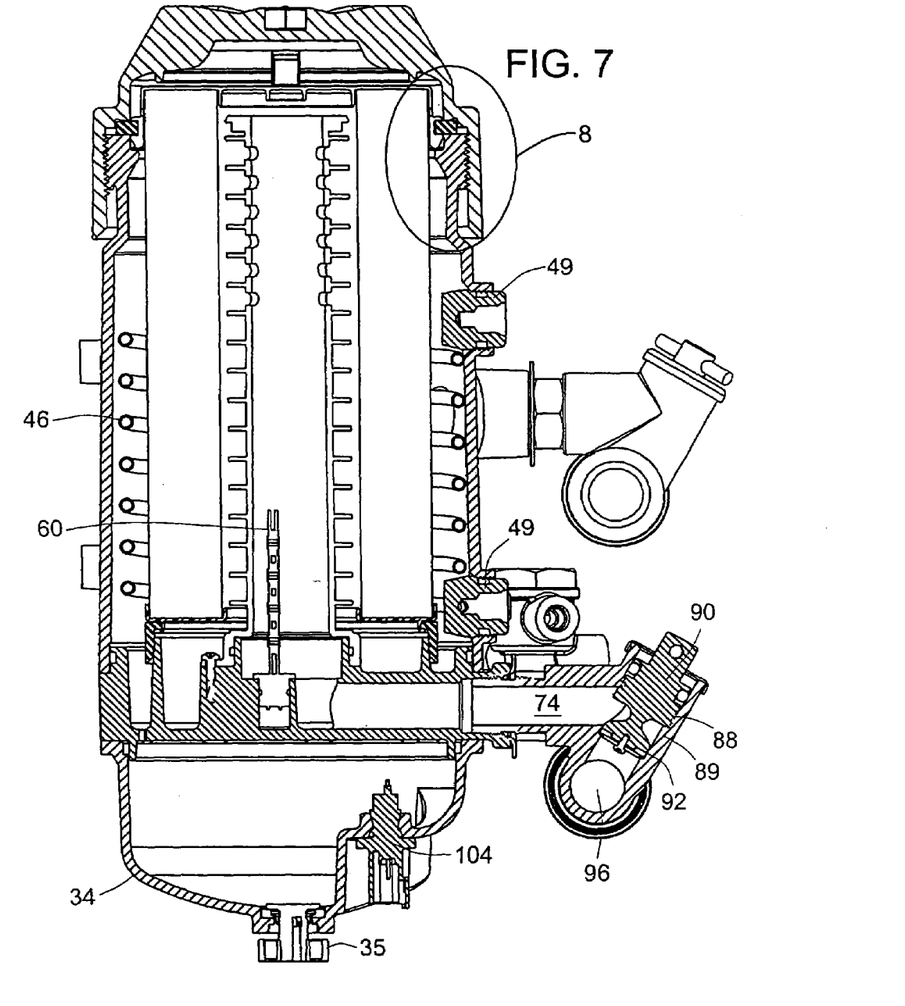
FIG. 7 is a sectional view through a filter housing showing the relationship between the cartridge and the housing and illustrating some of the system accessories.

Other peripheral elements are also illustrated in connection with FIG. 1, including a thermostat valve 45 which is provided primarily in fuel filter applications where it is desired to utilize a liquid heater for raising the temperature of the fuel. A warm fluid is passed through the thermostat valve 45 to coils 46 internal to the filter (see FIG. 7 where they serve to heat the fluid). A pair of ports 49 are provided, and are associated with the thermostat 45 in FIG. 1. The ports 49 are connected to an internal coil 46 which is illustrated in FIG. 7. The unit can also be provided with an electric heater 60 (see FIG. 7). Wires 62 penetrate a sealed aperture 63 in the baseplate 24 for making connections to the internal heater 60.

A further port in the housing 21 allows connection of a plugged filter indicator 48 which will be described in greater detail below. It suffices to say for the moment, the plugged filter element 48 has a port which is connected to both the filtered and unfiltered regions 51, 52 (in FIG. 3) to measure differential pressure across the filter and, by that mechanism, determine when the filter is sufficiently plugged to raise an alarm.

While all of the elements associated with the system 20 will not be described in detail, they do emphasize an inventive aspect of the invention, namely the extreme flexibility which is provided by the multiple ported housing with adaptable baseplate and changeable (and keyed) filter cartridge arrangement.

FIG. 4 illustrates the features of the invention which simplify arranging individual filter housings 21 in a bank. Using the mounting bosses 30 on the back of the filter, a plurality of filter housings 21 are mounted in a single bank 70. The bank is based on the plate 32 to which the filter housings 21 are bolted, and itself has mounting holes 72 for securing the filter bank 70 to structure. It is seen that the inlet ports 40 and outlet ports 42 are in different horizontal planes when the filters are mounted in a gang, and this simplifies interconnection between filters and also connections to external elements. The inlet and outlet ports 40, 42 are provided with special tee type fittings in accordance with the invention. Referring concurrently to FIG. 4 which shows the filter bank and FIG. 10 which shows one of the tee fittings, it will be seen that each of the tee fittings includes a trunk 74 which is connected to the associated port 40 or 42. Fluidically connected to each trunk 74 is a T-arm 76 having oppositely directed ports 77, 78 referring to FIG. 4. With the tee fittings arranged in this manner, it is relatively simple to plumb the filter units in parallel. Connector tubes 80 are connected between associated ports 77, 78 as illustrated. The ports 77, 78 are preferably O-ring and threaded ports for tube connections, so that tube sections 80 are relatively easily and reliably connected between the two. Ports not used can readily be plugged. With the arrangement illustrated in FIG. 4, a plug 82 is located in the left hand most port 77 on the outlet side, and in the right most port 78 on the inlet side. The left hand most port 77 on the inlet side is connected to a supply as suggested at 83, and a right hand most port 78 on the outlet side is connected to a conduit which runs to the engine as suggested at 84. With the illustrated configuration, both housings 21 are connected in parallel to accept unfiltered fuel from the supply 83 and supply filtered fuel via conduit 84 to the engine.

It is feature of the invention that individual filters in the housings 21 can be changed without shutting the engine down. To that end, each of the tee connectors 73 can be provided with a valving arrangement indicated generally at 86. The valve is arranged to allow shut-off of the connection between the trunk 74 and the T-arm 76, but without interfering with flow through the T-arm. Thus, if one of the filters is to be shut-down for changing a filter, the associated valves 86 can be moved to the closed position, at which point there is no flow into or out of the associated filter, whereas the flow continues from the supply to the engine through the other filter or filters in the bank. With the valve 86 shut-down, the cover can be removed, the filter changed, the cover replaced, then the valve reopened so that normal operation can continue. A filter can be changed without shutting down the engine.

Figure 10:
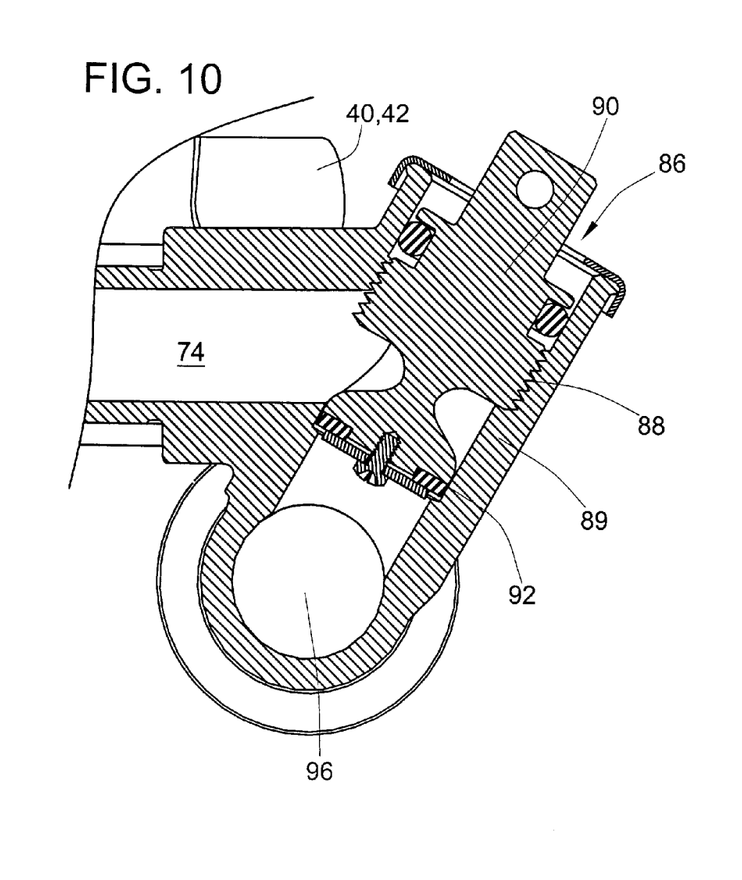
FIG. 10 is a view showing the valve associated with the inlets and outlets.

In contrast to relatively expensive ball valves used in the past, the present invention utilizes a simple plug valve as best illustrated in FIG. 10. A threaded portion 88 of the valve body 89 is fit with a threaded plug 90. A threaded plug has a closure section 92. In the position illustrated in FIG. 10, the valve is closed, since it will be seen that the flow from the trunk 74 to the T-arm 76 is not possible, having been blocked by the plug portion 92. When it is desired to open the filter to flow, the plug is rotated counterclockwise, to draw the plug 90 further out of the valve, moving the plug member 92 to a position where it does not block the passage connecting the trunk to the T-arm.

The ability to change filters without shutting down the engine is a desirable situation in many applications, such as on an electric generating system or a marine application, or other types of applications where the engine runs continuously. By their nature, fuel filters are changed more frequently than other filters, and being able to change them without interrupting the flow of fuel is desirable. It is also noted that plugs are inserted in most of the feature ports in the system of FIG. 4. This is not only to simplify the drawings and to illustrate the parallel plumbing between inlets and outlets, but also to emphasize the point that in its simplest application, the filter can be supplied without most of the special features, for relatively simple, for example, warm weather, applications.

Figure 5:
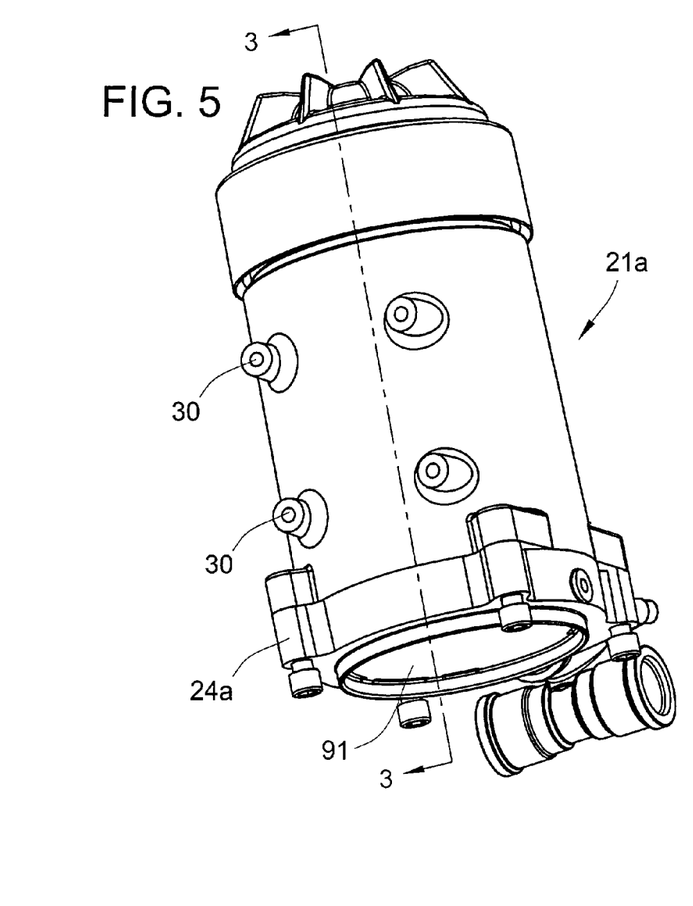
FIG. 5 shows a variation of the housing of FIG. 1 having a different bottom constructed for higher pressure applications.

FIG. 5 shows additional versatility in the system, primarily in the ability to interchange bottom plates to change the application to which the filter is directed. Whereas the filter units of FIGS. 1, 2 and 4 all had a sump bowl and were arranged for fuel filter application, the filter unit 21a of FIG. 5 is arranged for hydraulic and oil filter applications. The primary difference between the filters, in addition to dispensing with most of the peripheral attachments, is the provision of a different baseplate 24a. In contrast to the baseplate 24 which included a provision for a fuel bowl, the baseplate 24a has a rigidified bottom 91 adapted to resist substantially higher pressures. Thus, the housing, being configured for higher pressures, is adaptable to ordinary lubricating applications as well as higher pressure hydraulic applications. In contrast to the relatively low pressures encountered in fuel filter applications, pressures as high as 150 psi can be encountered in lubrication applications, and as high as 800 psi in hydraulic applications. The base 24a also has, similar to the channel 43 of FIG. 3, an internal connection between the outlet port 42 and the filtered region. Similarly the baseplate 24a will have a raised flange 57 for cooperating with a radial seal gasket on the hydraulic filter to be inserted in the housing of FIG. 5.

Figure 6:
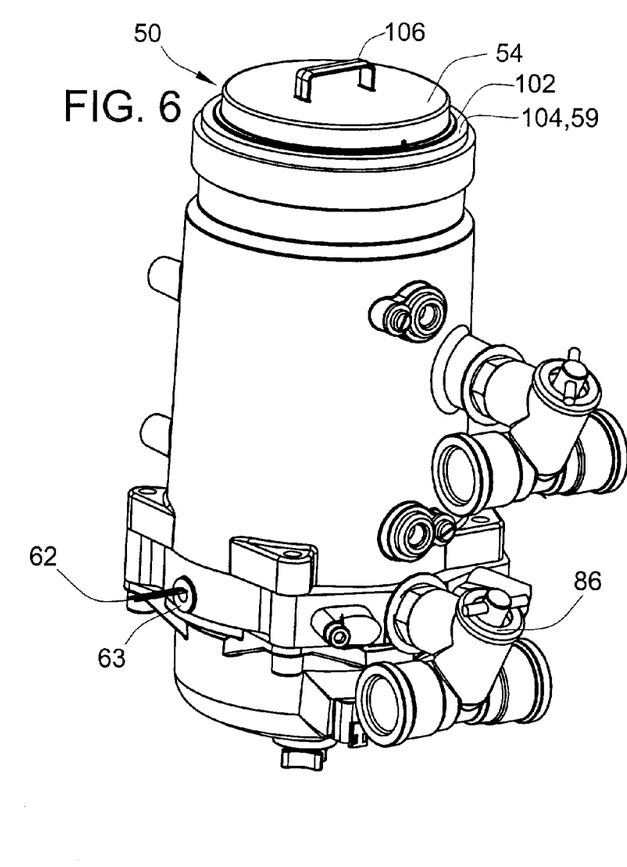
FIG. 6 shows a filter housing with cover removed exposing the top of the filter cartridge.

FIG. 6 illustrates the system with the cover 26 removed. It will be seen that with the cover removed, the upper portion of the cartridge 50 is exposed, particularly the upper endcap 54 thereof. Also shown is the upper axial seal gasket 102 which is compressed between the flange 59 formed on the housing and a corresponding flange 58 (see FIG. 8) on the cover. The cartridge 50 conveniently has its own handle 106 to allow ready removal of the cartridge from the housing once the cover is removed.

FIG. 7 is primarily illustrates the variety of accessories which can be provided with a cartridge according to the present invention. The fluid heater 46 connected to ports 49 has already been mentioned. An auxiliary electrical heater 60 connected to external wires is also provided. The self-venting drain valve 35 at the lower end of the fuel bowl 34 is illustrated in cross-section. An electrical water-indicator 104 is also included which can sense water in the material in the fuel bowl and light a signal light.

The cartridge 50 is an integral part of the system. It is environmentally friendly in that it contains no metallic parts. As such, a centertube, when one is needed, is provided by the housing. For example, FIG. 3 illustrates a centertube 120, carried by the base 24 and supporting the otherwise unsupported inner bore of the cartridge 50.

The cartridge includes endcaps 54, 55, which are normally made of metal. In the present case, however, they are made of plastic. In practicing this aspect of the invention, provision is made for accommodating for the reduced strength of these materials. For example, the upper endcap 54 would tend to bow with pressures inside the filter. To alleviate that a pressure equalization aperture 122 is provided in the rim of the upper endcap 54 to allow the high pressure from the unfiltered zone 51 to appear at the top of the upper endcap 54. Having thus relieved that problem, however, in a plugged filter condition, the high pressure on the top of the filter would tend to force the upper endcap 54 downwardly, attempting to crush the filter element of the otherwise unsupported filter. To prevent that, the upper endcap 54 is securely supported in the housing structure itself. Thus it will be seen that the upper endcap is provided with angled projections, such as ribs 124 which serve to center the filter by riding over projection 125 in the housing. Projections 124 have lower shoulders 126 which seat on a ridge 127 on the interior of the housing 21. Thus, when the filter is properly positioned, the shoulders 126 will seat upon and travel no farther than the ridge 127. Even in a plugged filter condition, the pressures will not be capable of driving the endcap 54 down further than this position, preventing crushing of the filter in this situation.

With respect to gasketing, it will be seen that the upper axial seal gasket 102 is a simple disc-like structure which is carried in a groove 102a in the upper endcap. Preferably the rubber gasket is sized so that it is snapped in place in the groove 102a for reliable retention.

The lower gasket 56 is similarly fit within a groove 56a in the lower endcap, and snapped in place for reliable retention as shown in FIG. 3. The lower gasket has a skirt 130 which overlies an upstanding annular flange 132 in the base of the filter housing. With pressure in the unfiltered region 51 being higher than pressure in the clean region 52, the operating pressure in the filter tends to force the skirt 130 against the flange 132, maintaining the effectiveness of the seal. This same pressure which forces the skirt 130 against the flange 132 also forces the skirt 130 against the endcap 55, rendering the seal even more reliable. Finally, positioning the lower radial seal gasket 56 at the outer periphery of the housing lends additional benefit in keeping the lower endcap 55 with a slight pressure differential in the downward direction. The bottom of the endcap 55 is in the clean region 52 of the filter and thus at a lower pressure. The upper endcap 54 is at a somewhat higher pressure due to its connection through the dirty region and the pleats. Thus the differential force will tend to force the lower endcap 55 downward slightly, keeping the filter element in tension, which is an acceptable condition to a pleated paper filter.

FIG. 8 shows additional detail of the main seal between the cover 26 and the housing 21 which prevents fluid in the housing from exiting the housing. As seen, it is an axially compressed seal 102 and is compressed between the shoulder 58 on the cover and the similar shoulder 59 on the housing. The lid has female threads 140 which mate with male threads 142 on the housing. As best shown in FIG. 8 the lid 26 has a long mating section 143 below the female threads 140 which have a close fit between the outside diameter of the housing male threads 142 and the inside diameter of the mating section on the lid. By arranging the structure in this way, the lid automatically becomes aligned with the housing 21 and it forces the lid 26 to be threaded correctly and avoids cross threading. Large diameter threads are prone to cross threading, and the elongated section where the lid first has a smooth section which fits over the threads in the housing, before the respective housing threads are mated, helps to prevent this from occurring.

A significant feature of the invention is the fact that the upper and lower seals 102, 56 on the cartridge are attached to the cartridge itself. Thus they are placed in their proper location by the manufacturer. Because of the positive snap fit of the gaskets, they are very difficult to remove, and thus the gaskets are in their proper place when the cartridge is dropped into the housing. This feature makes the changing of cartridges for the filtering system almost full proof. The mechanic does not require any knowledge as to where to place loose gaskets in the system, because there are no loose gaskets. This makes changing of the cartridges fast, easy, avoids errors, and is almost as simple as changing a spin-on canister.

Since the main seal between the housing and the lid is an axial seal 102, the lid 26 is easy to spin on and off. In addition, it is only necessary to tighten the lid hand tight. If the main seal were a radial seal, the lid tightening would require a wrench and additional effort. With respect to user convenience, this is a significant positive feature.

When considering the universality of the housing and filter arrangement, a keying system which associates the particular type of filter with a particular housing can also be an important feature. For example, in the ganged situation of FIG. 4, the two filters in the two parallel housings might have slightly different characteristics. In other ganged situations, where the filters are running individually but not in parallel, it will be typical to have different filters in adjacent identical housings. A keying system which prevents the installation of the wrong filter would be of material benefit.

Figure 11:
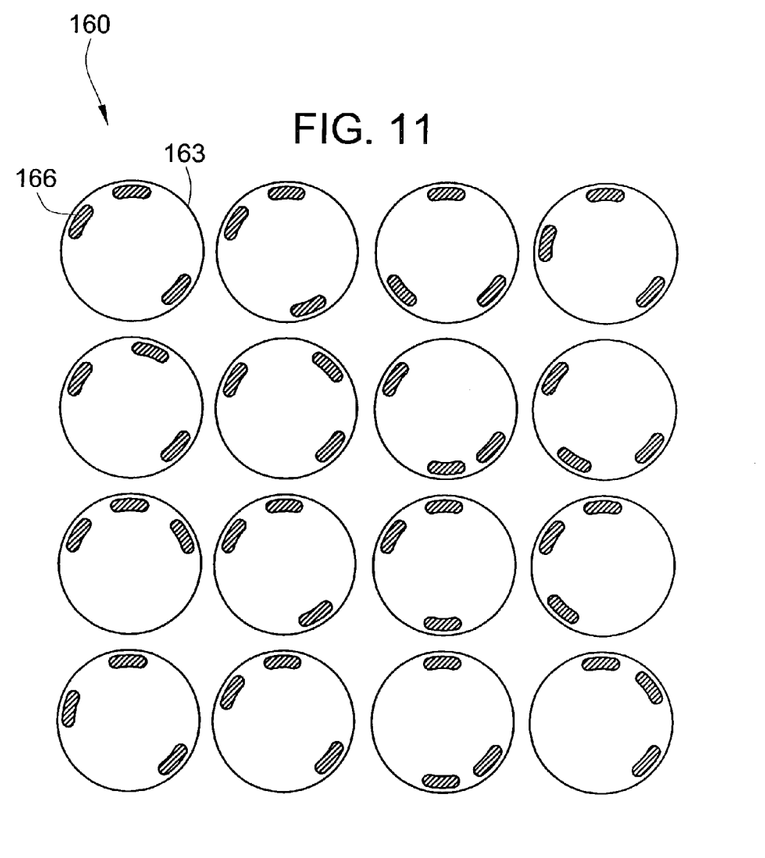
FIGS. 11 and 12 diagrammatically illustrate the keying of filters to the filter housing.
Figure 12:
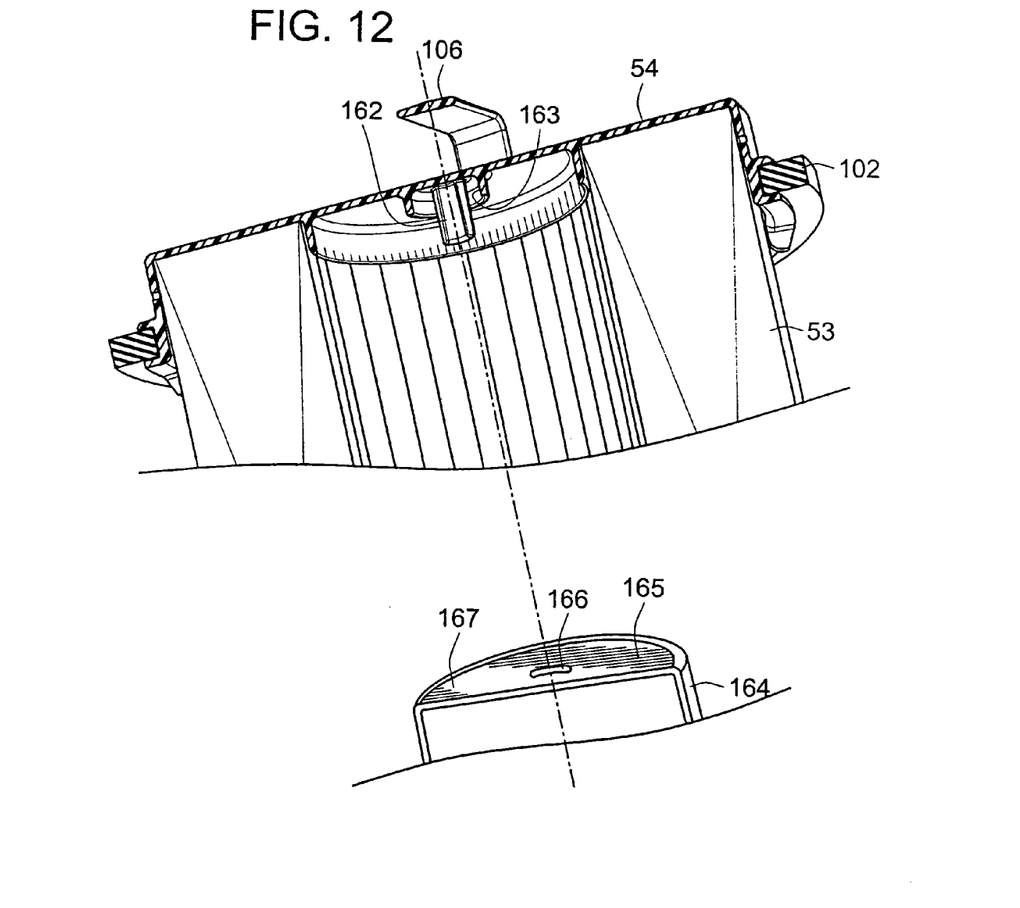

FIGS. 11 and 12 illustrates a keying feature which can be used in the practice of the present invention. The inside of the upper endcap 54 (see FIG. 12) is provided with a plurality of key positions, best illustrated in FIG. 11. It will be seen that at a given radius from the center of the endcap 54, a plurality of key positions 160 are provided. The illustrated embodiment includes eight key positions in a single ring. More or fewer key positions per ring, as well as additional rings can also be provided, but it is believed that the eight key positions, which can provide the sixteen possibilities illustrated in FIG. 1, is adequate for most applications.

Referring primarily to FIG. 12, it will be seen that a single key 162 is provided on the underside of the illustrated endcap in a given position. While only a single key is shown in FIG. 12, as contrasted with the three keys of FIG. 11 it is believed that the single key 162 will adequately illustrate the invention without overcomplicating the drawings. The key 162 is in a fixed angular position with respect to the key circle 163 (the circle in which the keys are located). The key 162 projects into the internal bore of the filter element 53. FIG. 12 shows a portion of the housing centertube 164 having a top surface 165 which is substantially solid except for a key opening 166. The upper surface 165 of the centertube 164 has a plurality of key positions in a key circle 167 in the same pattern as illustrated in FIG. 11. However, instead of projections 162, the keys in the upper surface 165 are apertures to receive the projections. FIG. 12 shows a single aperture 166 positioned in the key circle 167 to engage the single projection 162 positioned in the key circle 163. Thus, when the filter is installed in the housing, the keys 162 will align and allow the filter to reach the seated position, allowing the cover 26 to be placed on the housing and operation to continue. If the wrong filter inserted, the filter will not seat, and the user will be incapable of completing assembly.

This feature is particularly significant when using a universal housing as illustrated in this application. For example, two housings might be used side-by-side to provide a primary and a secondary fuel filter system. Both housings would be of the same diameter and height, but would require different filter cartridges. The keys will prevent the cartridges for one of the housings from being installed incorrectly in the other housing. It would be a simple matter to have several different key configurations to suit various applications and indeed various customers.

Figure 9:
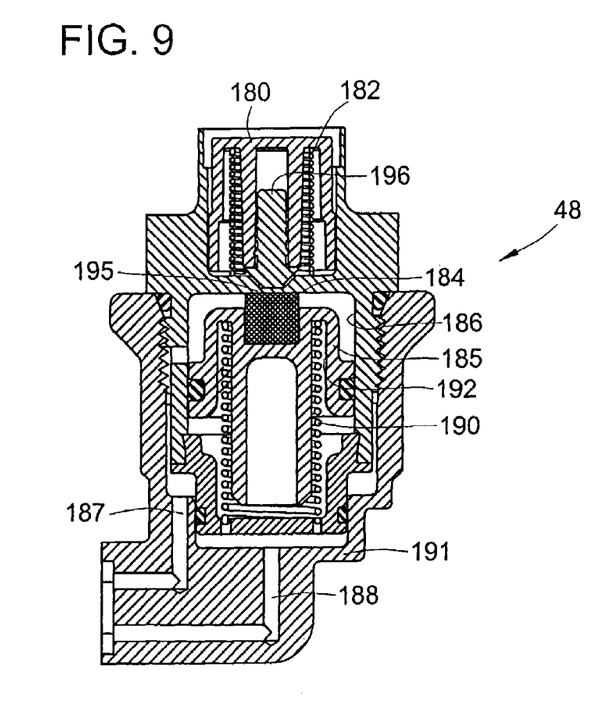
FIG. 9 is a cross-sectional view illustrating the plugged filter indicator.

A further significant feature of the invention is the plugged filter indicator 48 (see FIG. 1). A detailed cross-sectional view of the plugged filter indicator is shown in FIG. 9. The indicator has a button 180 at the top which is spring loaded by way of a spring 182. A magnet 184 is fit within the top end of a piston 185 which rides in a cylinder 186. The cylinder 186 is ported to the high pressure region 51 of the filter via a conduit 187, and to the low pressure region 52 of the filter housing via a conduit 188. As such, the differential pressure across the filter is also applied across the piston 185, with the high pressure side on top. A calibrated spring 190 is arranged between the body 191 of the housing and a cavity 192 within the piston 185. Thus the piston 185 is normally biased to the upward position, with the magnet 184 very near a thin wall 195 which separate the magnet 184 from an armature 196 in the button 180. When they are closely positioned, the magnet attracts the armature 196 and keeps the button 180 withdrawn into its associated housing. However, when the differential pressure across the filters build up to a level determined by the calibration of the spring 190, the piston 185 is driven downwardly, separating the magnet 184 from the armature 196. The button 180 is then released and remains in the upward position, even if the piston 185 again returns to its top position. To reset the plugged filter indicator, it is necessary to manually depress the button 180 to re-latch it to the magnet 184.

The plugged filter indicator is thus easily ported into the universal housing, is highly reliable and does not introduce complications to the overall structure. In addition, it is relatively economical and has very little possibility of creating leaks in the system or otherwise deleteriously affecting the system operation. The calibration spring 190 can also be changed for different applications. For example, a relatively light spring would be used in fuel applications where the differential does not get much higher than say five to seven inches of mercury. When the housing is set up for a lubrication application or hydraulic application, heavier springs are used which would change the set point to somewhere in the range between 15 to 50 psi. This ready ability to alter the uncomplicated plugged filter indicator is believed to be a significant advance over the prior art.

Figure 13:
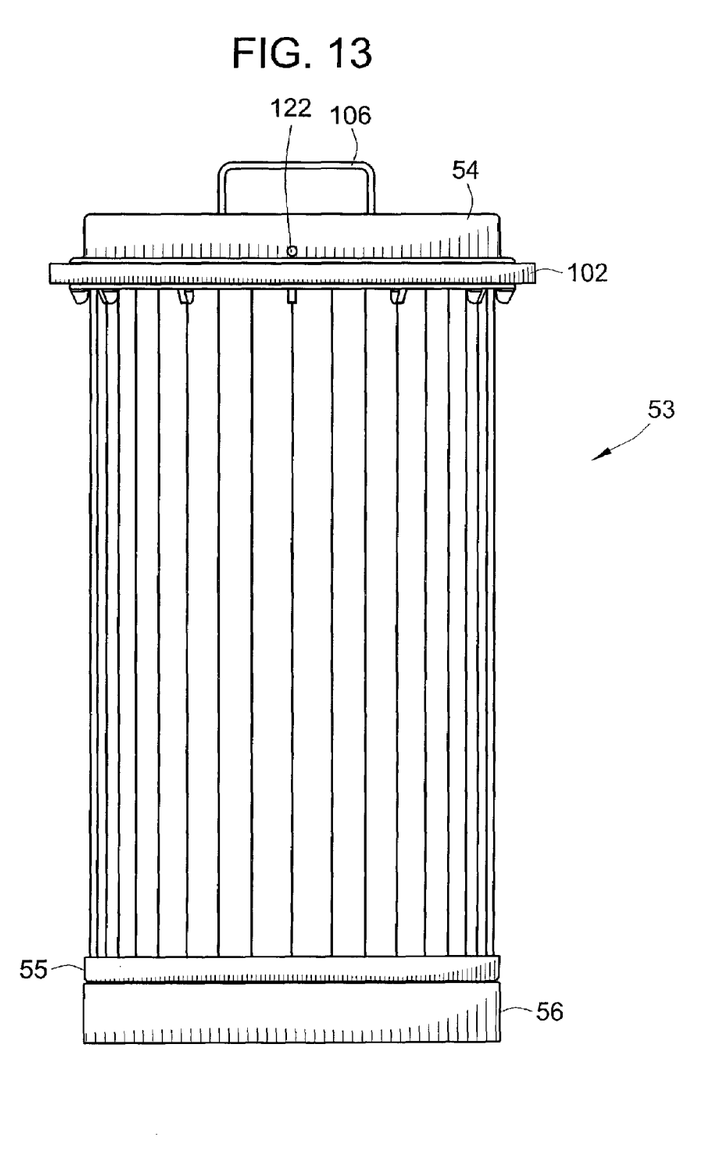
FIG. 13 is an elevational view of a typical filter cartridge.

It is emphasized that the filter cartridge to be used with this system is an environmentally friendly filter made up of elements which can all be incinerated. FIG. 13, for review, shows, in elevation, one form of that filter. FIGS. 3 and 13 illustrate the filter cartridge to include upper endcap 54, lower endcap 55 having a filter element 53 supported therebetween. The filter element is potted into channels in the respective endcaps using conventional potting techniques. The lower radial seal gasket 56 is set in a groove 56a in the lower endcap. Similarly, the axial seal gasket 102 is set in a groove 102a in the upper endcap 54. The pressure equalization port 122 is also illustrated. It will thus be apparent that once it is spent, filters such as that shown in FIG. 13 can be removed from the housing, collected and incinerated, and will leave very little residue.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter system comprising in combination:
    a housing having a closed bottom and removable cover,
    a filter cartridge for insertion into the housing and securing therein by locking the removable cover on the housing, the cartridge being in the form of an open center cylinder having an axis, and having no metallic parts,
    the housing having at its base an upstanding annular flange having a diameter about the same as the outer diameter of the cartridge,
    the cartridge carrying a radial seal in the form of a depending skirt fixed to a lower endcap, the skirt having a diameter which causes the skirt to overlie the annular flange such that when the filter is in operation internal pressure creates a radial seal between the skirt and the flange,
    the cartridge having an upper endcap carrying an axial seal axially positioned to sealing fit between the housing and the cover when the cover is in its locked position, and
    cooperating supports and stops on the inside of the housing and the lower portion of the upper endcap, comprising an annular ledge formed on an inner surface of the housing cooperating with a plurality of projections on the lower portion of the upper endcap to provide a positive seat and stop which prevents operating pressure from forcing the upper endcap into the filter beyond its seated position.

2. The filter system of claim 1 in which the upper endcap includes a pressure equalizing aperture which allows inlet fluid to pass to a region between the top of the upper endcap and the cover of the filter housing, to prevent bowing of the upper endcap under operating pressure.

3. The filter system of claim 1 in which the plurality of projections comprise a plurality of ribs on the upper endcap for guiding the cartridge into the housing, the ribs having shoulders at their lower portion which seat upon the annular ledge formed in the internal periphery of the housing so as to provide a positive seat for the upper endcap to resist crushing pressures.

4. The filter system of claim 1 in which the filter cartridge includes a handle formed in the top of the upper endcap, and the cover provides sufficient space to receive the handle.

5. The filter system of claim 1 in which the filter housing includes a center tube supported by the base and fitting within the open center of the cartridge for resisting crushing forces on the filter element.

6. The filter system of claim 5 in which the housing includes a removable base, the removable base carrying the upstanding annular flange, and the base providing a fluid connection between a central region in the housing containing filtered fluid, and an outlet port.

7. The filter system of claim 1 further including a plurality of keys disposed in selected ones of associated keyed positions in the cartridge, and a corresponding plurality of slots in a top surface of a center tube.

8. The filter system of claim 1 in which the housing has a threaded upper section for receiving the cover, the cover having a two section rim of approximately the same internal diameter and capable of fitting over the threads on the housing, a first lower portion of the rim being sized to slip over the threads to lead the cover to the upper portion of the rim which is threaded, whereby the lower portion tends to align the cover before the threads engage to prevent cross threading.

9. The filter system of claim 1 further including a plugged filter indicator, the indicator being connected to the body and having internal connections for sensing upstream and downstream pressure in the unfiltered and filtered regions respectively.

10. The filter system of claim 9 in which the plugged filter indicator further includes:
a piston supported by a spring calibrated to a desired pressure differential, the spring driving the piston to a rest position in the normal operating condition, the upstream and downstream pressures being ported to opposite sides of the piston to move the piston from the normal to the plugged filter position upon indication of a pressure condition indicative of a plugged filter,
an indicator button which is spring loaded to an extended position but which has an armature attracted to a magnet of the piston when the piston is in the rest position to prevent exposure of the indicator,
whereby displacement of the piston in response to a plugged filter condition releases the indicator for display.

11. The filter system of claim 10 further including a manual reset for the plugged filter indicator to cause the armature to be reattracted to the magnet in the piston after the plugged filter condition has passed.

12. The filter system of claim 1 wherein the projections are made of a material more rigid than the axial seal.

13. The filter system of claim 1 wherein at least one of the projections comprise an angled surface to facilitate insertion of the filter cartridge into the housing.

14. The filter system of claim 1 wherein the projections are disposed below the axial seal.

* * * * *

UNITED STATES PATENT AND TRADEMARK OFFICE
CERTIFICATE OF CORRECTION

PATENT NO. : 7,182,864 B2
APPLICATION NO. : 10/457733
DATED : February 27, 2007
INVENTOR(S) : Brown et al.

Page 1 of 1

It is certified that error appears in the above-identified patent and that said Letters Patent is hereby corrected as shown below:

Column 5, Line 35: "It is feature" should read --It is a feature--.

Column 6, Line 42: "FIG. 7 is primarily illustrates" should read --FIG. 7 primarily illustrates--.

Signed and Sealed this

Twenty-third Day of December, 2008

JON W. DUDAS
*Director of the United States Patent and Trademark Office*